(12) United States Patent
Potter et al.

(10) Patent No.: US 7,798,392 B2
(45) Date of Patent: Sep. 21, 2010

(54) DELIVERY CONTAINER FOR DIGITAL DISC

(75) Inventors: Thomas C. Potter, Oak Hill, VA (US); Christopher M. Stratton, Springfield, VA (US); Hernan A. Borja, Merrifield, VA (US)

(73) Assignee: United States Postal Service, Washington, DC (US)

( * ) Notice: Subject to any disclaimer, the term of this patent is extended or adjusted under 35 U.S.C. 154(b) by 1124 days.

(21) Appl. No.: 10/953,452

(22) Filed: Sep. 30, 2004

(65) Prior Publication Data

US 2005/0247769 A1 Nov. 10, 2005

Related U.S. Application Data

(60) Provisional application No. 60/511,636, filed on Oct. 17, 2003.

(51) Int. Cl.
*B65D 27/06* (2006.01)
*B65D 27/34* (2006.01)
*B65D 27/00* (2006.01)
*B65D 27/08* (2006.01)
*B65D 85/30* (2006.01)

(52) U.S. Cl. .......... 229/305; 229/313; 229/70; 229/72; 206/308.1

(58) Field of Classification Search .......... 229/301, 229/305, 315, 72, 313, 70; 206/308.1
See application file for complete search history.

(56) References Cited

U.S. PATENT DOCUMENTS

| 1,957,704 | A | * | 5/1934 | Drachman | 229/305 |
| 2,686,005 | A | * | 8/1954 | Hyman | 229/305 |
| 3,999,700 | A | * | 12/1976 | Chalmers | 229/68.1 |
| 4,473,153 | A | | 9/1984 | Colangelo | |
| 4,905,831 | A | | 3/1990 | Bagdis et al. | |
| 5,676,466 | A | * | 10/1997 | Lindenbeck | 383/5 |
| 6,230,964 | B1 | | 5/2001 | Saito | |
| 6,966,484 | B2 | * | 11/2005 | Calonje et al. | 229/305 |
| 2002/0020642 | A1 | | 2/2002 | Langerak | |
| 2003/0102364 | A1 | | 6/2003 | Juliao et al. | |
| 2003/0121962 | A1 | | 7/2003 | Hamblin | |

FOREIGN PATENT DOCUMENTS

WO WO 0236448 A1 * 5/2002

OTHER PUBLICATIONS

International Search Report (PCT) and Written Opinion of the International Searching Authority for International Application No. PCT/US04/31952, dated Jan. 11, 2005.

* cited by examiner

*Primary Examiner*—Jes F Pascua
(74) *Attorney, Agent, or Firm*—Finnegan, Henderson, Farabow, Garrett & Dunner, LLP

(57) ABSTRACT

A one and two-way disc mailer for mailing DVDs, CDs, video game discs, or other discs from a sender to a recipient via first class mail. The disc mailer provides improved protection to the disc during mail processing while weighing less than or equal to 1 ounce, including the weight of the disc, for first-class compatibility.

32 Claims, 6 Drawing Sheets

DELIVERY CONTAINER FOR DIGITAL DISC

RELATED APPLICATIONS

This application is related to and claims priority of U.S. Provisional Application No. 60/511,636 entitled "Disc Mailer" filed Oct. 17, 2003, which is incorporated herein by reference in its entirety.

DESCRIPTION

TECHNICAL FIELD

This invention relates to one-way and two-way delivery containers for discs such as compact discs ("CDs"), video game discs, or digital video discs ("DVDs").

BACKGROUND

Envelopes for shipping discs containing digital data are conventionally known and are sometimes referred to as disc mailers, even though the shipping may be provided by various delivery service providers. Conventional disc mailers have several drawbacks. For example, some conventional disc mailers do not adequately protect discs during the mailing process, resulting in lost, damaged, or stolen discs. Other conventional disc mailers may exceed certain shipping weight limitations—when weighed with the disc—resulting in increased shipping costs. Other conventional disc mailers use paper that is not inherently opaque, thus requiring additional printing costs, or paper that is too flexible, thus resulting in delayed processing times.

A two-way disc mailer is designed for shipping a disc via a delivery service to a first recipient and later permitting the first recipient to forward the disc to a second recipient. Two-way disc mailers are popular among DVD rental companies who provide a customer with a rental disc for the customer's viewing, along with a mailer to send the disc back to the rental company.

In one example of a shipping weight limitation, for first-class United States Postal Service ("USPS") postage, the weight of the mailpiece must be equal to or less than 1 ounce. The weight of a DVD is approximately 0.62 ounce, which is slightly heavier than the weight of a CD. As a result, the weight of a disc mailer being processed and shipped via the USPS is preferably less than or equal to about 0.38 ounce, so that first-class postage rates to apply.

Most delivery items are processed automatically. For automatic processing by the USPS, for example, the dimension of the mailpiece must comply with the USPS aspect ratio regulation. The aspect ratio is expressed as a ratio of length (the direction parallel to the address) divided by height. For example, a postcard 140 mm long by 89 mm high has an aspect ratio of 1.57. An aspect ratio between 1.3 and 2.5, inclusive, is required for automation compatibility. Because discs have a diameter of approximately 120 mm, the height of the disc mailer must be greater than 120 mm, and the length must therefore be greater than 156 mm, to comply with the minimum aspect ratio requirement. As a result, at least 36 mm of length of the disc mailer may become folded during mail processing, possibly covering the information required for processing, resulting in unnecessary delays. Consequently, it is desirable for the disc mailer to be constructed of material that is less susceptible to bending, while still conforming with the first-class postage weight limitations.

Another aspect of mail processing is "cancellation," which can possibly damage the disc enclosed in the mailer. Cancellation involves stamping the mailpiece with a postmark that contains the post office name, state, ZIP code, and month, day, and year that the mail matter was canceled. The Advanced Facer Canceller System ("AFCS") is the primary letter canceling machine used in USPS processing and distribution centers. If during cancellation, the canceling machine strikes the portion of the mailer containing the disc, the disc may be damaged. Generally, the mailpiece is stamped anywhere in the area from about 30 mm from the top of the mailpiece, to about 100 mm from the right edge of the mailpiece. Accordingly, it is desirable to bias (that is, position and retain) the disc within the mailer to an area away from where cancellation may occur.

Further, during processing, some delivery items are marked with a unique identification tag ("ID tag") so that they can be identified and sorted correctly. The ID tag is machine-readable and improves both tracking and processing of the marked mail piece. For two-way mailers, the ID tag from the initial outbound mailing must not be visible on the return envelope during the second processing. If the ID tag from the initial outbound mailing is visible on the return envelope, the mail may be delayed during return processing.

Also during processing, the AFCS orients the delivery item with the length side facing up and the short side substantially vertical. As the delivery item is fed through the AFCS, it is transported by belts and pulleys throughout the system. These belts and pulleys apply a frictional force to the delivery item that is substantially parallel to its length. As a result, this frictional force can have the undesirable consequence of inadvertently opening conventional disc mailers that are not completely bound along their length. Accordingly, if the disc mailer comprises a folded flexible sheet of material, it is desirable to locate the folds along the length of the mail piece in order to prevent the AFCS from inadvertently opening or damaging the disc mailer. It may also be desirable to locate the direction of grain of the folded material so that the folds are substantially parallel to the grain, thus minimizing the chance the flexible sheet will tear along the folds.

Additionally, because of the required aspect ratio for mail pieces, the disc in a two-way disc mailer with top and bottom sides not completely bound along its entire length may be vulnerable to theft. The disc in this type of conventional mailer may be manipulated out of the mailer without tearing the envelope. Accordingly, locating the folds of a two-way disc mailer along the length-side of the mail piece advantageously provides improved theft deterrence.

The present invention overcomes many of the deficiencies found in conventional disc mailers, including those discussed above.

SUMMARY OF THE INVENTION

Consistent with the invention, systems and methods are provided for improved one-way and two-way disc mailers.

According to one aspect of the invention, a disc mailer is formed of a flexible sheet, comprising first and second panels separated by a predetermined fold line. The first and second panels are adherable to each other to form a pouch for removably holding a disc. The pouch has a slot through which the disc can pass. A third panel is separated from the second panel by a second predetermined fold line to be folded over the slot and adhered to an outer surface of the disc mailer to cover the slot to form a delivery container having a length and a width. A first address area is located on the outer surface of the third panel and is externally visible when the third panel is folded over the slot. A perforation on the third panel opens the disc mailer to access the disc from the pouch. The perforation allows detachment of the first address area from the disc mailer.

The reader should understand that both the foregoing general description and the following detailed description are exemplary and explanatory only and are not restrictive of the invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Figure 1:
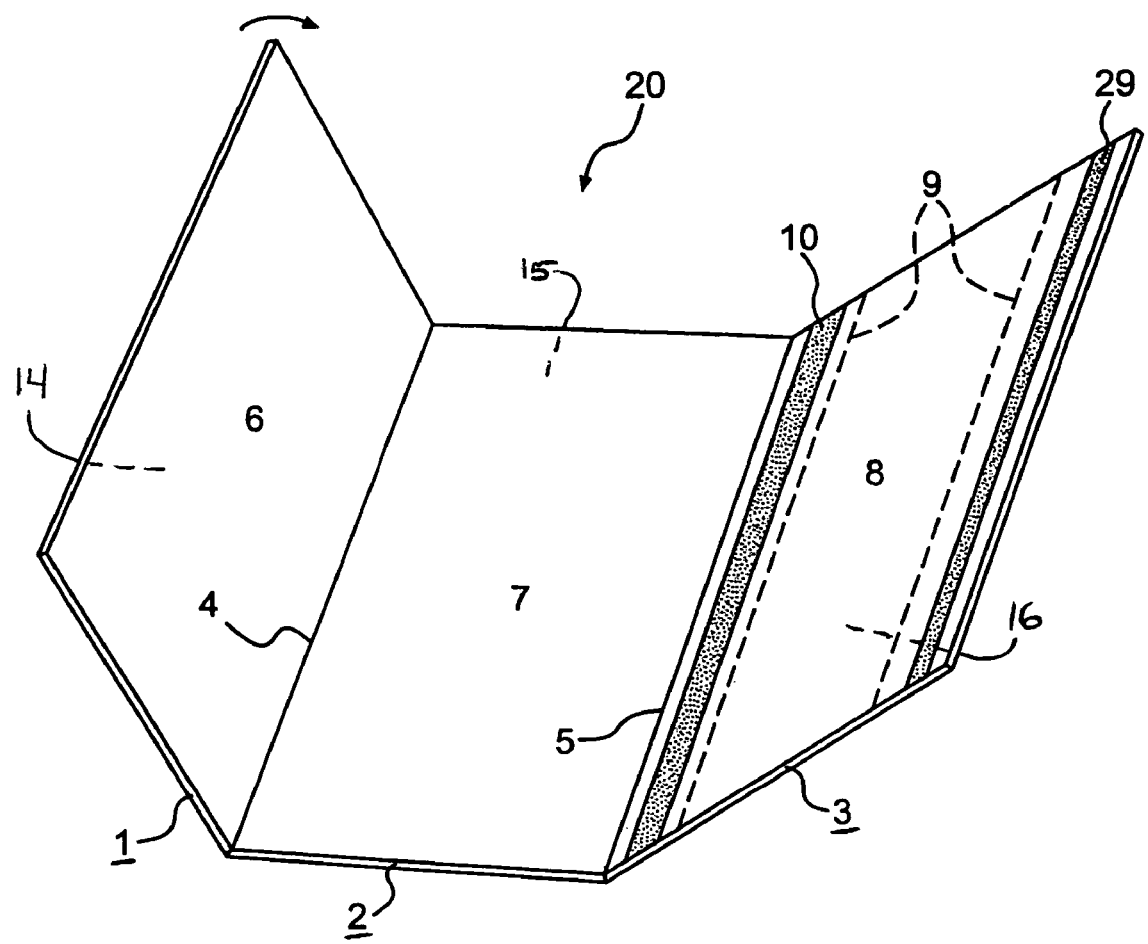
FIG. 1 illustrates a perspective view of a mailer consistent with disclosed embodiments, prior to being folded and adhered to create the finished mailer.
Figure 2:
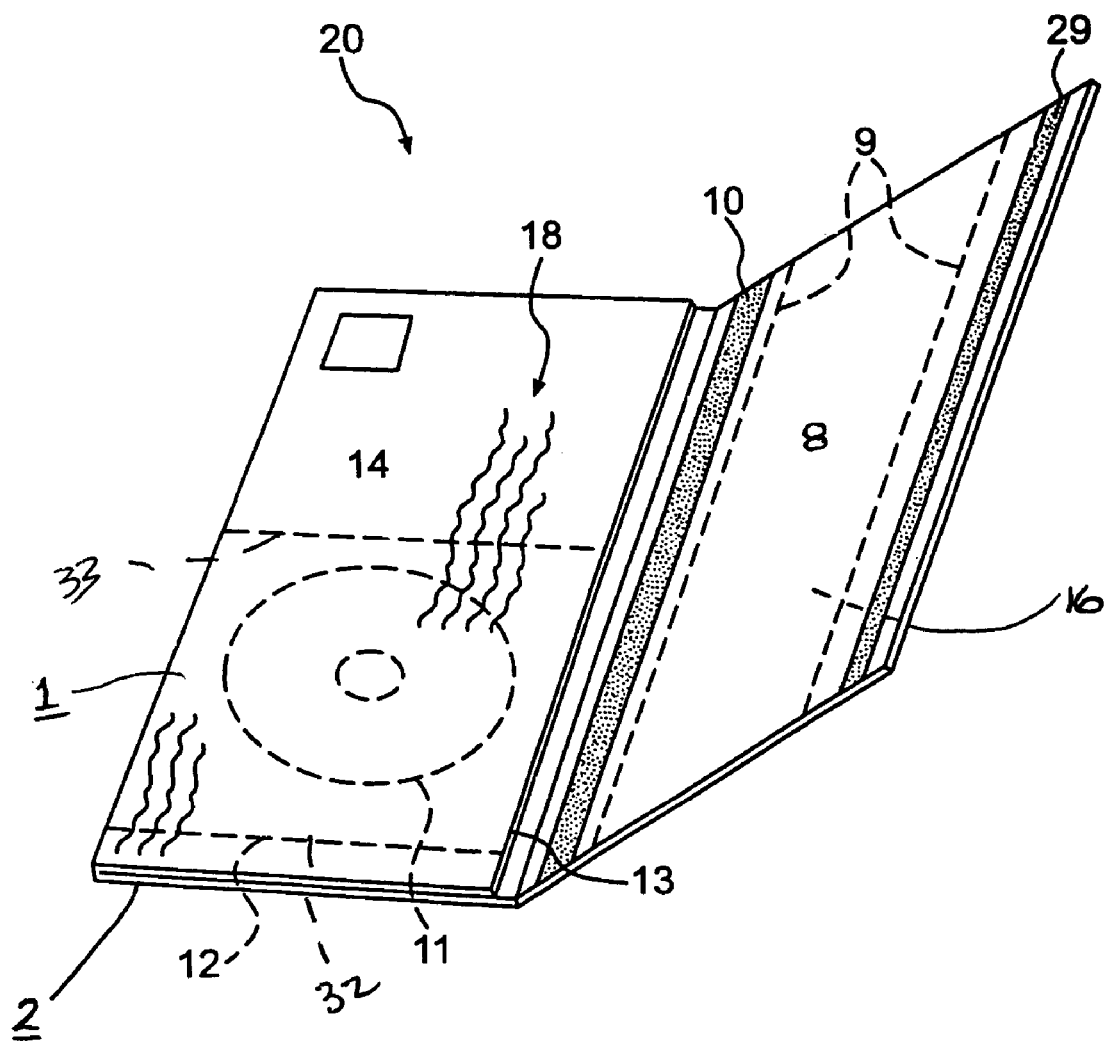
FIG. 2 illustrates a folded and adhered mailer of FIG. 1, the dotted lines representing the intended position of a pouch and a digital disc within the pouch.
Figure 3:
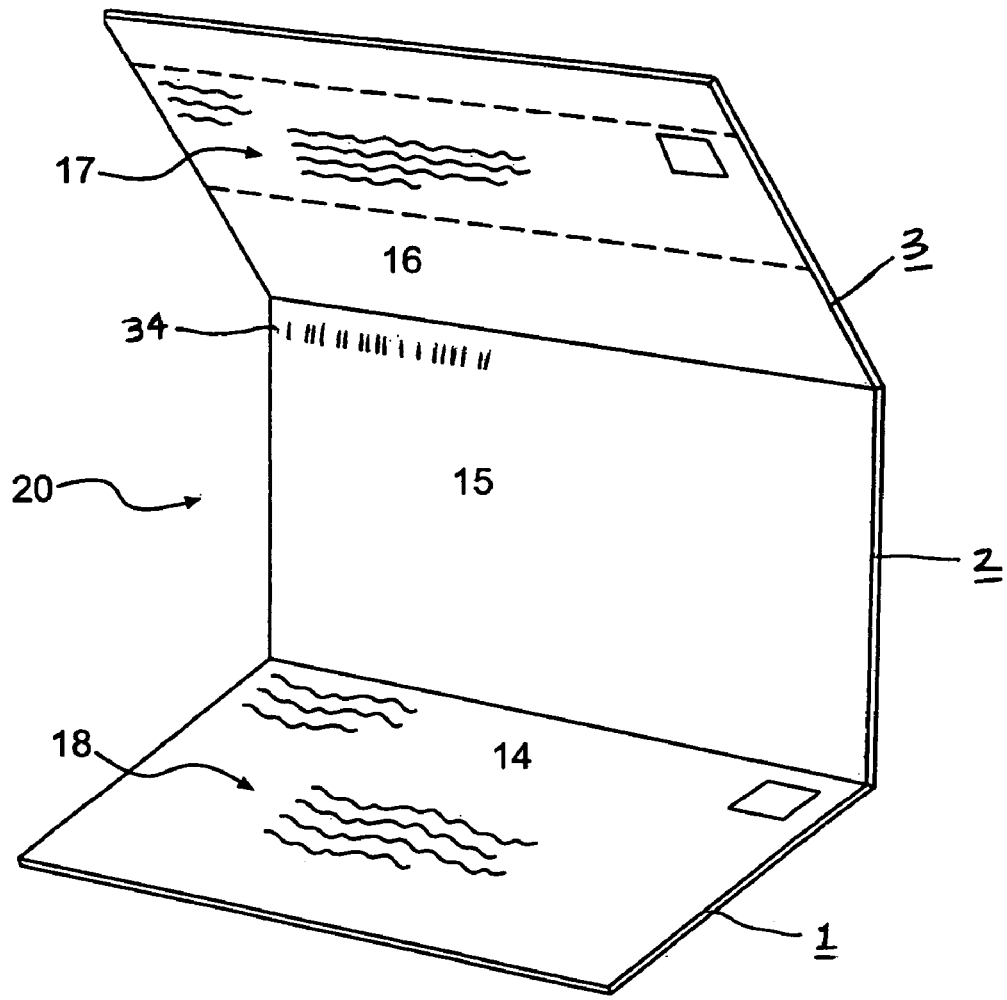
FIG. 3 illustrates a reverse side of the mailer of FIG. 1.

Consistent with the invention, a two-way disc mailer 20 is illustrated in FIGS. 1-3. The disc mailer 20 is designed to permit a disc 11 (FIG. 2) to be shipped to a first recipient (e.g., from a DVD rental company to a customer), whereby the first recipient can remove the disc 11 for viewing or the like. After the first recipient views or uses the disc 11, the first recipient can forward the disc 11 to a second recipient (e.g., back to the DVD rental company) using the same disc mailer 20.

In an exemplary embodiment, the disc mailer 20 comprises a flexible sheet of, for example, cardboard that is folded along a first predetermined line 4 (FIG. 1) and a second predetermined line 5 to form a left panel 1, a center panel 2, and a right panel 3. Line 4 separates the left panel 1 from the center panel 2. Line 5 separates the right panel 3 from the center panel 2. The inner surface 6 of the left panel 1 is folded along line 4 toward the inner surface 7 of the center panel 2 to form a volume for holding the disc 11. The inner surface 6 can be glued or otherwise attached to the inner surface 7, for example along lines 32 and 33, to form the pouch 12. A disc 11 can be removably inserted into the pouch 12 via a slot 13 that is formed between the left panel 1 and the center panel 2 and between lines 32 and 33.

After a disc 11 is inserted into the pouch 12, the inner surface 8 (FIG. 1) of the right panel 3 is folded along line 5 toward an outer surface 14 of the left panel 1, thereby covering the slot 13 to secure the disc 11 for mailing to the first recipient. Glue or other adhesive is preferably applied to the outer periphery 29 of the inner surface 8 of the right panel 3. After left panel 1 is folded to cover center panel 2, right panel 3 (which is longer in width than left panel 1) can be folded along a line 9 closest to periphery 29 to secure the inner surface 8 to an outer surface 15 of the center panel 2, thereby causing the right panel 3 to completely cover the outer surface 14 of left panel 1. Adhesive is preferably also applied in the form of an adhesive strip 10 of the inner surface 8 of the right panel 3, but adhesive strip 10 is not activated for adherence until the mailer is used to send the disc to the second recipient, as explained below.

Preferably, when the inner surface 8 of the right panel 3 is adhered with adhesive to the outer surface 15 of the center panel 2, a first recipient's address 17 (FIG. 3), which is printed on an outer surface 16 of the right panel 3, is visible, whereas a second recipient's address 18, which is printed on the outer surface 14 of the left panel 1 is not visible. Accordingly, only the first recipient's address 17 appears on the disc mailer 20 when the disc 11 is mailed to the first recipient. The other side of the disc mailer displays the outer surface 15 of the center panel 2, which has no printed address and may contain, for example, an advertisement or graphic design.

When a disc 11 is shipped to a first recipient in a two-way mailer of the above-described embodiment, the first recipient can open the disc mailer 20 by removing part of the right panel 3 from the disc mailer 20 by, for example, tearing along perforations 9. The area of the right panel 3 between the perforations 9 is not adhered to the center panel 2, which allows for easy removal. Once this part of the right panel 3 is removed, and because adhesive strip 10 is not initially adhered to other panels, the first recipient can unfold the remaining part of the right panel 3 to access the disc 11 from the slot 13.

After the first recipient views or otherwise uses the disc 11, the first recipient inserts the disc 11 back into the pouch 12 in preparation for mailing the disc 11 and disc mailer 20 to the second recipient. Once the disc 11 is in the pouch 12, the first recipient activates adhesive strip 10 (for example, by moistening) and permanently adheres the remaining portion of the inner surface 8 of the right panel 3 to the outer surface 14 of the left panel 1. Adhesive strip 10 may, of course, be activated by other means, for example, by removing a peel-away strip that covers adhesive strip 10. The first recipient's address 17 was removed when the first recipient detached part of the right panel 3 between the perforations 9. After adhering strip 10 to the left panel 1, the second recipient's address 18 appears on the disc mailer 20 and is no longer obstructed by the right panel 3. The disc 11 can now be mailed to the second recipient.

Figure 7:
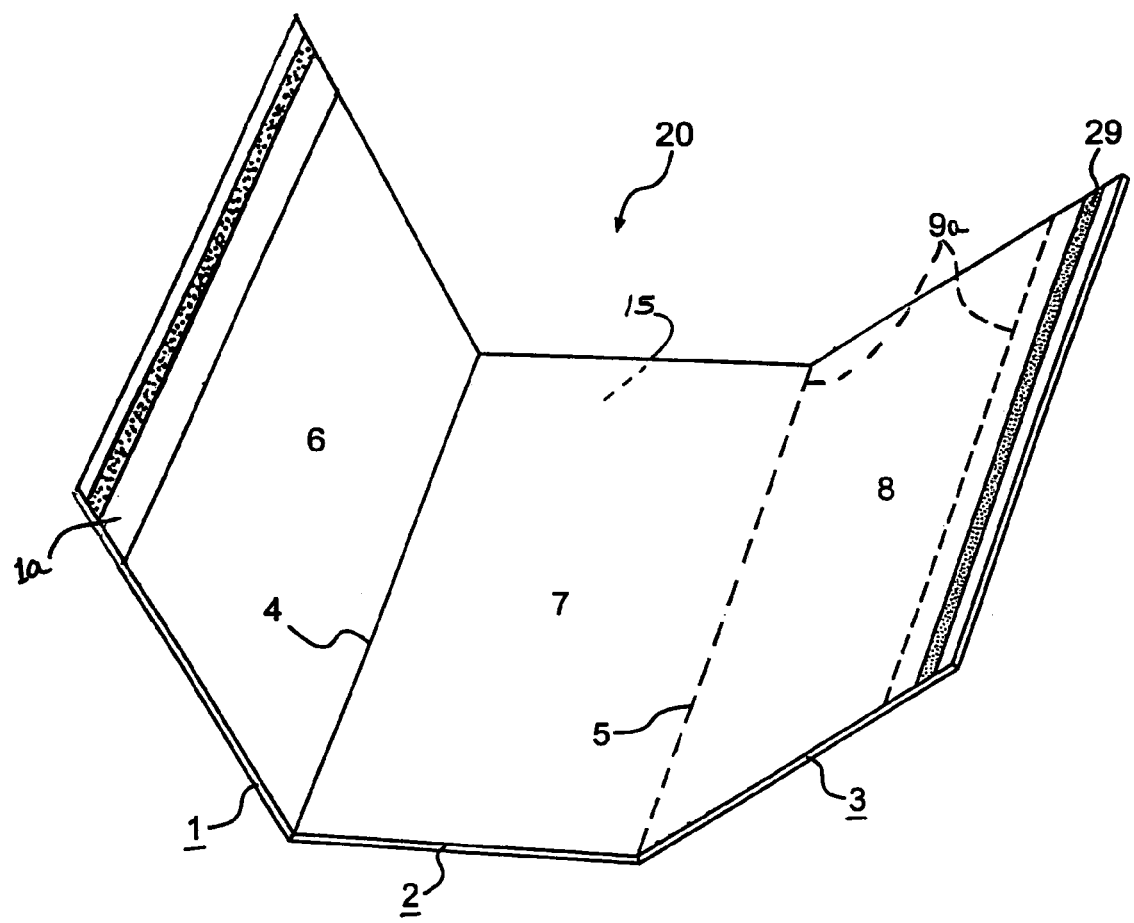
FIG. 7 illustrates a perspective view of an alternative embodiment, of a mailer consistent with disclosed embodiments, prior to being folded and adhered to create the finished mailer.

An alternative embodiment is illustrated in FIG. 7. The disc mailer can be opened by the first recipient along perforations 9a, which preferably removes most of right panel 3. The width of panel 1 is greater than the width of panel 3. Once the disc 11 is in the pouch 12 (FIG. 2) for mailing to the second recipient, the first recipient covers the slot 13 to secure the disc in pouch 12 by folding and permanently adhering an extended portion 1a (FIG. 7) of the left panel 1 to the outer surface 15 of center panel 2. This embodiment is advantageous because, if an initial ID tag 34 (FIG. 3) is located on outer surface 15, the extended portion 1a of left panel 1 covers the initial ID tag, thus preventing possible delays during return processing to the second recipient. The extended portion 1a of the left panel 1 can be provided as an alternative to the remaining portion of the right panel that has an adhesive strip 10 discussed above.

Figure 5:
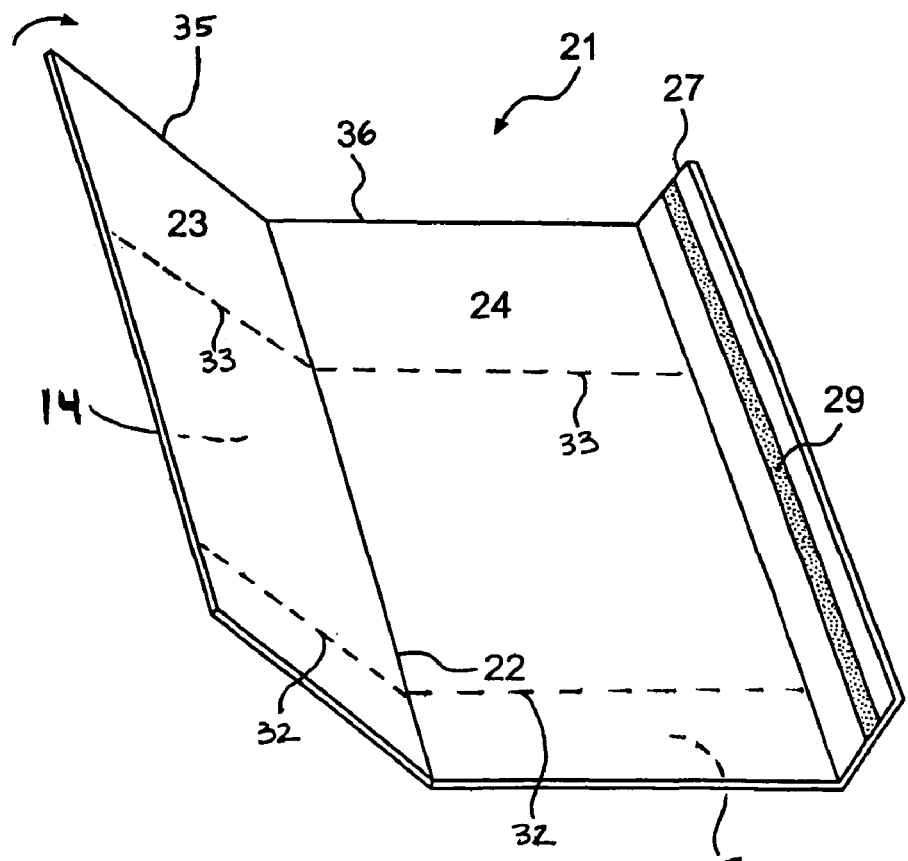
FIG. 5 illustrates a perspective view of an embodiment of a one-way mailer consistent with disclosed embodiments, prior to being folded and adhered to create the finished mailer.
Figure 6:
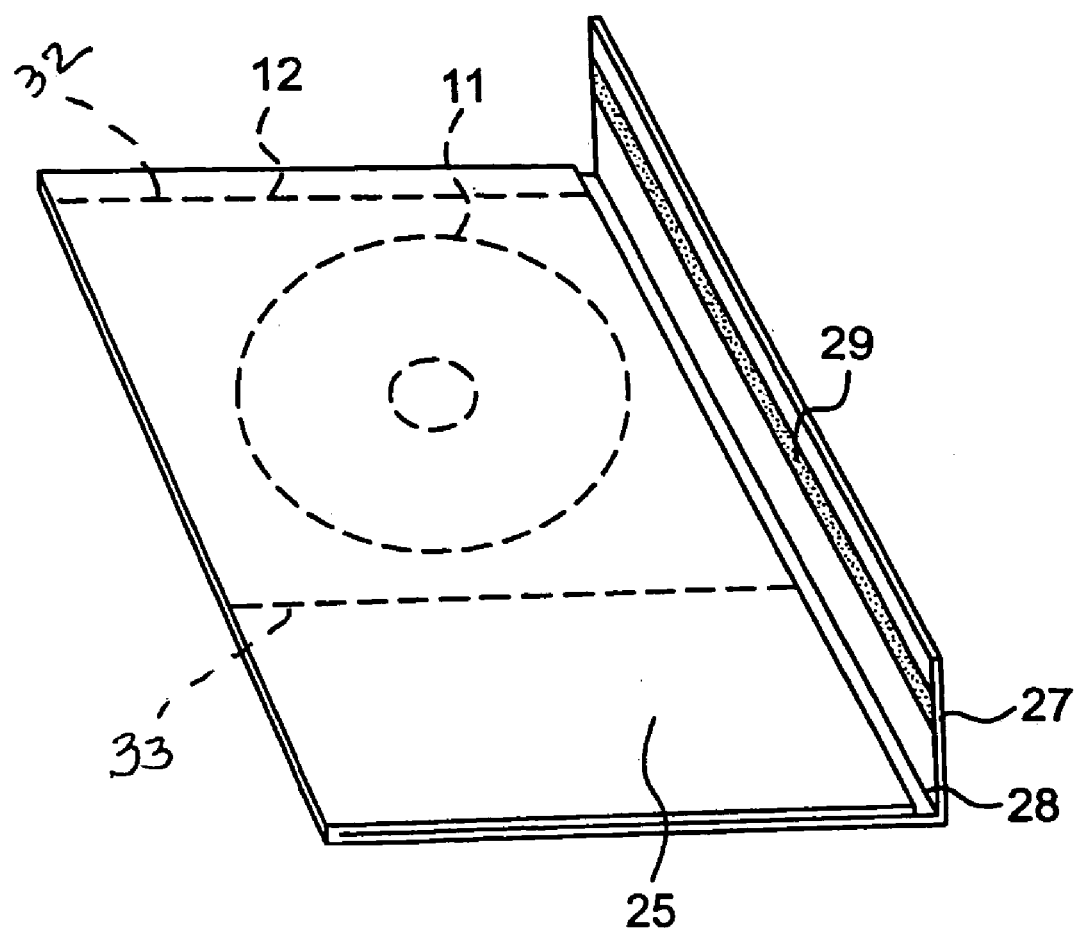
FIG. 6 illustrates a folded but not yet adhered mailer of FIG. 5.

Referring now to FIGS. 5 and 6, an exemplary embodiment of a one-way disc mailer 21 is provided. Unlike the two-way disc mailer 20, the one-way disc mailer 21 of this embodiment is only designed to ship a disc once.

In this exemplary embodiment, the disc mailer 21 comprises a flexible sheet of, for example, craft paper that is folded along a predetermined line 22 to form a left panel 35 and a right panel 36. Line 22 separates the left panel 35 from the right panel 36. An inner surface 23 of the left panel 35 is folded along line 22 toward an inner surface 24 of the right panel 36 to form a pouch 12 for holding the disc 11. The inner surface 23 of the left panel 35 is glued or otherwise attached to the inner surface 24 of the right panel 36 to form the pouch 12. The inner surface 23 can be glued or otherwise attached to the inner surface 24, for example along lines 32 and 33, to form the pouch 12.

After the disc 11 is inserted into the pouch 12, a flap 27 from the right panel 36 is folded along line 28 toward the left panel 35. The flap 27 is then adhered to the left panel 35 with glue adhesive strip 29 or other adhesive, thus securing the disc 11 in the pouch 12 for mailing to a recipient. The address of the recipient can be printed on either the outer surface 15 of right panel 36 or the outer surface 14 of left panel 35.

Figure 4:
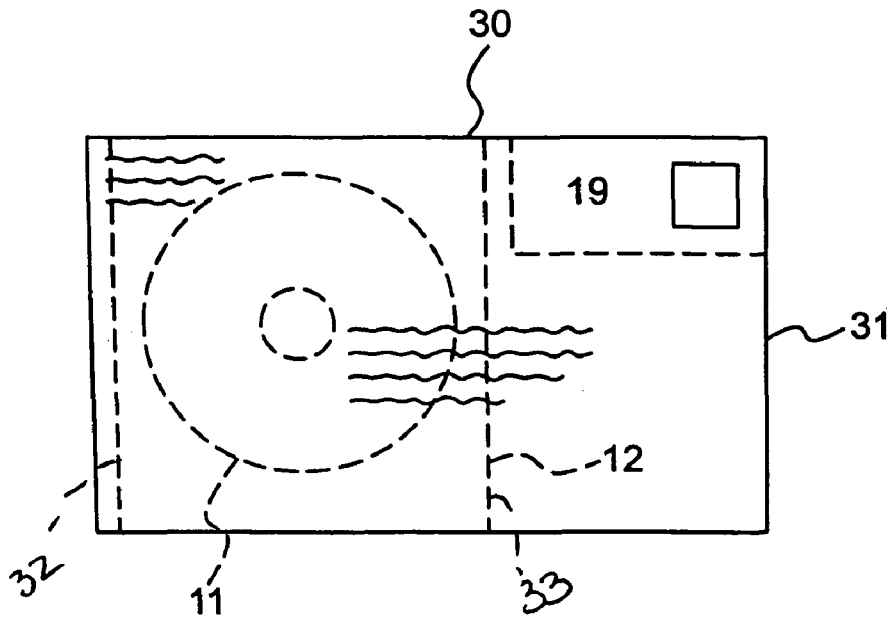
FIG. 4 illustrates the mailer of FIG. 1, prepared for shipment to a first recipient.

FIG. 4 illustrates how the one-way and two-way disc mailers of the present invention bias a disc 11 away from the cancellation area 19. Lines 32 and 33, which demark the outer bounds of the pouch 12 and limit movement of the disc 11 in the left and right direction according to FIG. 4, are suitably offset from cancellation area 19. More specifically, it is line 33 that prevents the disc 11 from entering the cancellation area 19. As previously discussed, the disc mailer may be canceled anywhere in the area 19, which is from about 100 mm from the right edge 31 of the disc mailer 20 and 21 to about 30 mm from the top edge 30. Thus, line 33 should be located at least about 100 mm from the right edge 31 of the disc mailer. Biasing the disc 11 in this manner reduces the risk of damage to the disc 11 during cancellation.

The position of the pouch 12 within the mailer is essentially dictated by placement of lines 32 and 33 along the length of the mailer. The pouch, and therefore the disc, may be positioned either to the left side of the mailer (as illustrated), or can be placed more centrally in the mailer (not shown). This is accomplished by shifting the location of lines 32 and 33 along the length of the mailer. Central placement of the disc allows the mailer to move more stably through the processing equipment. For mailers of certain dimensions, a more central placement of the disc can also prevent the extra length of the mailer in the cancellation area from folding. Such folding may cover information required for processing the mail piece, resulting in unnecessary delays.

Additionally, an exemplary embodiment of the disc mailer 20 and 21 enables the disc 11 to be mailed with first-class postage rates. First class postage rates apply if the total weight of the mailer is less than or equal to 1 ounce. Accordingly, because discs weigh approximately less than or equal to 0.62 ounce, a preferred embodiment of the disc mailer 20 and 21 weighs less than or equal to 0.38 ounce. In this embodiment and when weighed together with a disc 11, the disc mailer 20 and 21 will weigh less than or equal to 1 ounce and qualify for first-class postage rates.

Additionally, in an exemplary embodiment of the disc mailer 20 and 21, the predetermined lines 4 and 5 (FIG. 1), and 22 (FIG. 5) are substantially parallel to the length of the envelope (e.g., top edge 30 (FIG. 4)). This minimizes chances that the disc mailer 20 and 21 might become damaged or otherwise opened during the automatic mail processing.

Also in an exemplary embodiment of the disc mailer 20 and 21, the flexible sheet is formed of 24-pound or heavier craft paper (e.g., 28 pound craft paper). 24-pound or heavier craft paper provides improved resistance to bending while keeping the mailer 20 and 21 within first-class postage rate weight limitations. Alternatively, the flexible sheet of the disc mailer 20 and 21 is formed of white woven paper, which is generally easier to print on than regular craft paper.

In another exemplary embodiment of the disc mailer 20 and 21, the flexible sheet is formed from opaque paper. Using opaque paper eliminates the need for security printing, which is used for maintaining the confidentiality of the contents of mailer 20 and 21.

In an exemplary embodiment of the disc mailer 20 and 21, the predetermined lines 4, 5, and 22 are substantially parallel to the grain of the flexible sheet. This strengthens the mailer along lines 4, 5, and 22, thus minimizing the chance that the mailer might become damaged or otherwise opened during automatic mail processing.

In an exemplary embodiment of the two-way disc mailer 20, the inner surface 8 of the right panel 3 may comprise advertising material and coupons. In particular, coupons may be printed on the inner surface 8 of the right panel 3 between the perforations 9.

It will be apparent to those skilled in the art that various modifications and variations can be made to the structure and methodology of the present invention without departing from the scope or spirit of the invention. Thus, it should be understood that the invention is not limited to the examples discussed in the specification. Rather, the present invention is intended to cover modifications and variations of this invention.

What is claimed is:

1. A disc mailer, comprising:
   a flexible sheet forming
      first and second panels separated by a first predetermined fold line,
      the first and second panels comprising an extra length area and a pouch area separated by a first attachment line,
      the first and second panels adherable to each other at a first length of adhesive extending along the first attachment line and at a second length of adhesive extending along a second attachment line to form a pouch for removably holding a disc, and
      the pouch having a slot through which the disc can pass,
      the extra length area having an adhesive-free region, comprising a region with no adhesive between the first and second panels, and an edge contiguous to the adhesive-free region and defined by the first attachment line; and
   a third panel, separated from the second panel by a second predetermined fold line, foldable over the slot and adherable to an outer surface of the disc mailer to cover the slot to form a delivery container having a length and a width;
   a first address area on an outer surface of the third panel that is externally visible when the third panel is folded over the slot;
   a cancellation area located in a corner of the outer surface of the third panel, the cancellation area being disposed over the adhesive-free region of the extra length area and offset from the first length of adhesive when the third panel is folded over the slot, wherein the first length of adhesive extends at least partially between the first and second predetermined fold lines to bias the disc away from the cancellation area; and
   a perforation on the third panel for opening the disc mailer to access the disc from the pouch, the perforation allowing detachment of the first address area from the disc mailer;

wherein the first and second predetermined fold lines are substantially parallel to the length of the disc mailer.

2. The disc mailer of claim 1, comprising a second address area on an outer surface of the second panel that is covered when the third panel is folded over the slot.

3. The disc mailer of claim 1, wherein the disc mailer has a weight of about less than or equal to 0.38 ounce.

4. The disc mailer of claim 1, wherein movement of the disc in the pouch is limited by the first attachment line and the second attachment line such that the disc is located at least about 100 mm from a right edge of the disc mailer and at least about 30 mm from a top edge of the disc mailer.

5. The disc mailer of claim 1, wherein the flexible sheet comprises 24-pound or heavier craft paper.

6. The disc mailer of claim 1, wherein the flexible sheet comprises 24-pound or heavier white woven paper.

7. The disc mailer of claim 1, wherein the flexible sheet comprises opaque paper.

8. The disc mailer of claim 1, wherein the flexible sheet has a grain and the first and second predetermined fold lines are substantially parallel to the grain.

9. A two-way disc mailer, comprising:
a flexible sheet foldable along predetermined fold lines to form a left panel, a center panel, and a right panel, each of the panels having an inner surface and an outer surface,
wherein the left panel and the center panel comprise an extra length area and a pouch area separated by a first attachment line,
wherein the inner surface of the left panel is foldable toward the inner surface of the center panel and adherable thereto at a first length of adhesive extending along the first attachment line and at a second length of adhesive extending along a second attachment line to form a pouch for removably holding a disc,
wherein the extra length area has an adhesive-free region, comprising a region with no adhesive between the first and second panels, and an edge contiguous to the adhesive-free region and defined by the first attachment line,
wherein the pouch has a slot for removing the disc, and
wherein the inner surface of the right panel is foldable over the slot and adherable to an outer surface of the disc mailer to cover the slot to form a delivery container having a length and a width;
a cancellation area located in a corner of the outer surface of the right panel, the cancellation area being disposed over the adhesive-free region of the extra length area and offset from the first length of adhesive when the right panel is folded over the slot, wherein the first length of adhesive extends at least partially between the predetermined fold lines to bias the disc away from the cancellation area;
a first address area on the outer surface of the right panel that is externally visible when the right panel is folded over the slot;
a perforation on the right panel for opening the disc mailer and detaching the first address area from the right panel of the disc mailer, wherein the perforation permits a first recipient to remove the disc from the pouch via the slot;
a second address area on the outer surface of the left panel that is externally visible when the first address area has been detached from the disc mailer; and
an adhesive on the inner surface of a selected panel for adhering the inner surface of the selected panel to the pouch to cover the slot and to secure the disc in the pouch for mailing the disc to a second recipient when the first address area is detached from the right panel;
wherein the selected panel comprises the right panel or the left panel.

10. The disc mailer of claim 9, wherein the disc mailer has a weight of about less than or equal to 0.38 ounce.

11. The disc mailer of claim 9, wherein the predetermined lines are substantially parallel to the length of the disc mailer.

12. The disc mailer of claim 9, wherein movement of the disc in the pouch is limited by the first attachment line and the second attachment line such that the disc is located at least about 100 mm from a right edge of the disc mailer and at least about 30 mm from a top edge of the disc mailer.

13. The disc mailer of claim 9, wherein the flexible sheet comprises 24-pound or heavier craft paper.

14. The disc mailer of claim 9, wherein the flexible sheet comprises 24-pound or heavier white woven paper.

15. The disc mailer of claim 9, wherein the inner surface of the right panel comprises advertising material.

16. The disc mailer of claim 9, wherein the right panel includes two perforations and the inner surface of the right panel comprises a coupon located between the perforations.

17. The disc mailer of claim 9, wherein the flexible sheet comprises opaque paper.

18. The disc mailer of claim 9, wherein the inner surface of the left panel is glued to the inner surface of the center panel along the first attachment line and the second attachment line to form the pouch.

19. The disc mailer of claim 9,
wherein the selected panel comprises the left panel, and
wherein the left panel includes an extended portion that extends beyond the center panel, the extended portion including an adhesive that adheres the inner surface of the extended portion to the outer surface of the center panel to close the slot and cover an initial ID tag.

20. The disc mailer of claim 9, wherein the flexible sheet has a grain and the predetermined lines are substantially parallel to the grain.

21. A two-way disc mailer comprising:
a flexible sheet folded along predetermined fold lines to form a left panel, a center panel, and a right panel, each panel having an inner surface and an outer surface,
wherein the left panel and the center panel comprise an extra length area and a pouch area separated by a first attachment line,
wherein the inner surface of the left panel is foldable toward an inner surface of the center panel and attachable thereto at a first length of adhesive extending along the first attachment line and at a second length of adhesive extending along a second attachment line to form a pouch for removably holding a disc,
wherein the extra length area has an adhesive-free region, comprising a region with no adhesive between the first and second panels, and an edge contiguous to the adhesive-free region and defined by the first attachment line,
wherein the pouch has a slot for removing the disc, and
wherein an inner surface of the right panel is foldable over the slot and adherable to an outer surface of the disc mailer to cover the slot to form a delivery container having a length and a width;
a first address area on an outer surface of the right panel that is externally visible when the right panel is folded over the slot;
a second address area on the outer surface of the left panel that is externally visible when the first address area has been detached from the disc mailer;

a cancellation area located in a corner of the outer surface of the right panel, the cancellation area being disposed over the adhesive-free region of the extra length area and offset from the first length of adhesive when the right panel is folded over the slot, wherein the first length of adhesive extends at least partially between the predetermined fold lines to bias the disc away from the cancellation area;

a perforation on the right panel for opening the disc mailer and detaching the first address area from the right panel of the disc mailer, wherein the perforation permits a first recipient to remove the disc from the pouch via the slot; and the left panel having an extended portion, the extended portion adherable on its inner surface to an outer surface of the disc mailer to cover the slot and secure the disc in the pouch.

22. The disc mailer of claim 21, wherein the disc mailer has a weight of about less than or equal to 0.38 ounce.

23. The disc mailer of claim 21, wherein the predetermined lines are substantially parallel to the length of the disc mailer.

24. The disc mailer of claim 21, wherein movement of the disc in the pouch is limited by the first attachment line and the second attachment line such that the disc is located at least about 100 mm from a right edge of the disc mailer and at least about 30 mm from a top edge of the disc mailer.

25. The disc mailer of claim 21, wherein the flexible sheet comprises 24-pound or heavier craft paper.

26. The disc mailer of claim 21, wherein the flexible sheet comprises 24-pound or heavier white woven paper.

27. The disc mailer of claim 21, wherein the inner surface of the right panel comprises advertising material.

28. The disc mailer of claim 21, wherein the right panel includes two perforations and the inner surface of the right panel comprises a coupon located between the perforations.

29. The disc mailer of claim 21, wherein the flexible sheet comprises opaque paper.

30. The disc mailer of claim 21, wherein the inner surface of the left panel is glued to the inner surface of the center panel along the first attachment line and the second attachment line to form the pouch.

31. The disc mailer of claim 21, wherein the extended portion of the left panel is folded and adhered to the outer surface of the center panel to close the slot and cover an initial ID tag.

32. The disc mailer of claim 21, wherein the flexible sheet has a grain, and the predetermined lines are substantially parallel to the grain.

* * * * *